United States Patent [19]
Jürgens et al.

[11] 4,086,308
[45] Apr. 25, 1978

[54] PRESSURIZED RELIEF TANK FOR STEAM

[75] Inventors: Wolfgang Jürgens; Jörg Nageler, both of Erlangen, Germany; Josef Lippitsch; Julius Holzner, both of Graz, Austria

[73] Assignees: Siemens Aktiengesellschaft; Waagner-Biro Aktiengesellschaft, Munich, Germany

[21] Appl. No.: 759,395

[22] Filed: Jan. 14, 1977

Related U.S. Application Data

[63] Continuation of Ser. No. 550,280, Feb. 18, 1975, abandoned.

[51] Int. Cl.² ............................................. G21C 15/18
[52] U.S. Cl. .................................... 261/124; 176/37; 176/65
[58] Field of Search ............................ 176/65, 37, 38; 261/121 R, 124, 122, DIG. 10; 239/553, 565

[56] References Cited

U.S. PATENT DOCUMENTS

| 891,245 | 6/1908 | Geurink | 239/565 |
|---|---|---|---|
| 1,070,484 | 8/1913 | Kendall | 261/124 |
| 2,023,227 | 12/1935 | Henkel et al. | 24/124 |
| 2,050,117 | 8/1936 | Page | 261/124 |
| 2,869,844 | 1/1959 | Thomas | 261/124 |
| 3,097,072 | 7/1963 | Lippman, Jr. et al. | 261/124 |
| 3,738,577 | 6/1973 | Blanzy et al. | 239/553 |
| 3,889,707 | 6/1975 | Fay et al. | 176/38 |
| 3,972,772 | 8/1976 | Heitmann | 176/37 |
| 4,021,301 | 5/1977 | Frei | 176/37 |

Primary Examiner—Tim R. Miles
Assistant Examiner—Gregory N. Clements
Attorney, Agent, or Firm—Kenyon & Kenyon, Reilly, Carr & Chapin

[57] ABSTRACT

A pressurizer relief or surge tank for connection with the pressurizer of a pressurized-water coolant system, has the usual tank partly filled with water and with a pressurized-gas cushion above the water. For more uniform relief action, the bottom of the tank contains a distribution pipe means rather closely fitting the inside contour of the tank and having a large number of distributing holes in its upper periphery, both transversely and circumferentially, a pipe having an upper end for connection with the coolant pressurizer, extending through the top of the tank and down to the pipe means in the tank's bottom, where the pipe connects with the pipe means by a system of radial connecting pipes.

10 Claims, 2 Drawing Figures

PRESSURIZED RELIEF TANK FOR STEAM

This is a continuation division of application Serial No. 550,280 filed Feb. 18, 1975, now abandoned.

BACKGROUND OF THE INVENTION

A pressurized-water reactor has a reactor coolant system in which the necessary pressure is kept on the water, by being connected to a pressurizer. This is a vertical tank containing coolant in its lower part and pressurized gas in its upper part, the pressurized gas maintaining the necessary pressure on the coolant in the system.

Any sudden increase in the reactivity of the reactor can cause a sudden increase in the coolant pressure in the system, and, therefore, the pressurizer above its water level, is connected with a pressurizer relief or surge tank.

Such a relief or surge tank is also a tank partially filled with water and having a pressurized gas cushion above the water. During a coolant pressure surge, the pressurizer transfers the pressure increase from its coolant to its relief tank, and because of the pressure differential, the transfer is largely in the form of steam.

That steam is ordinarily radioactive to some degree and cannot be discharged directly to the atmosphere, it being the function of the relief tank to accept such steam. To do this, the relief tank must distribute the incoming steam within its water to condense the steam as much as possible to reduce the volume involved while providing for gas cushioning.

Heretofore, such a pressurized-water reactor coolant system pressurizer relief or surge tank has distributed the incoming steam through a large number of pipes and a number of distribution nozzles, arranged in the form of a Christmas tree. This has involved an undesirable construction and maintenance expense and necessitated the need for an undesirably large tank size.

SUMMARY OF THE INVENTION

The object of the present invention is to provide such a pressurizer relif or surge tank which has a simplified construction and which permits a reduction in the tank's size as compared to the tank size of the prior art relief or surge tank of equal capacity. To attain this object, instead of the Christmas tree arrangement, distribution pipe means in general and a tubular annulus, or pipe ring, specifically substantially fitting the inside contour of the tank, is positioned adjacent to the tank's bottom, this pipe means having uniformly distributed holes in its upper portion, a vertical pipe extending through the top of the tank downwardly, having a bottom end connected to this pipe means, the upper end of the pipe outside of the tank being adapted for connection with the reactor coolant system pressurizer to receive the pressurizer's steam discharge or surge whenever required.

The bottom end of the vertical pipe is closed by an inwardly convex baffle which is both pressure-resistant and deflects incoming steam from its vertical to radial directions. Above this baffle, a relatively large number of connecting pipes extend radially from above the convex baffle, outwardly to connect with the pipe means. Therefore, a surge of steam is uniformly distributed to the pipe means and by the latter subsequently.

The upper wall of the pipe means or ring pipe has its steam discharge holes widely distributed circumferentially throughout the entirety of the annulus and transversely the distribution ranges from an angular range of 100° to 140°, distributed in an upward direction.

With water in the bottom of this new tank and pressurized gas above the water, the vertical pipe is filled to an equal extent with the water. A steam surge first drives the water in the vertical pipe downwardly and through the distribution pipe means, this raising the water level in the tank and compressing its gas cushion, the steam then entering and being distributed very widely throughout the water so that, by condensation to water, steam pressure is quickly reduced uniformly and smoothly. Steam condensation occurs throughout the water very uniformly, permitting the water volume required, and, therefore, the tank size, to be decreased from normal. The construction materials and workmanwhip required are greatly simplified as compared to the prior art construction requirements.

BRIEF DESCRIPTION OF THE DRAWINGS

The presently preferred mode for carrying out the invention is schematically illustrated by the accompanying drawings, in which.

DETAILED DESCRIPTION OF THE INVENTION

Figure 1:
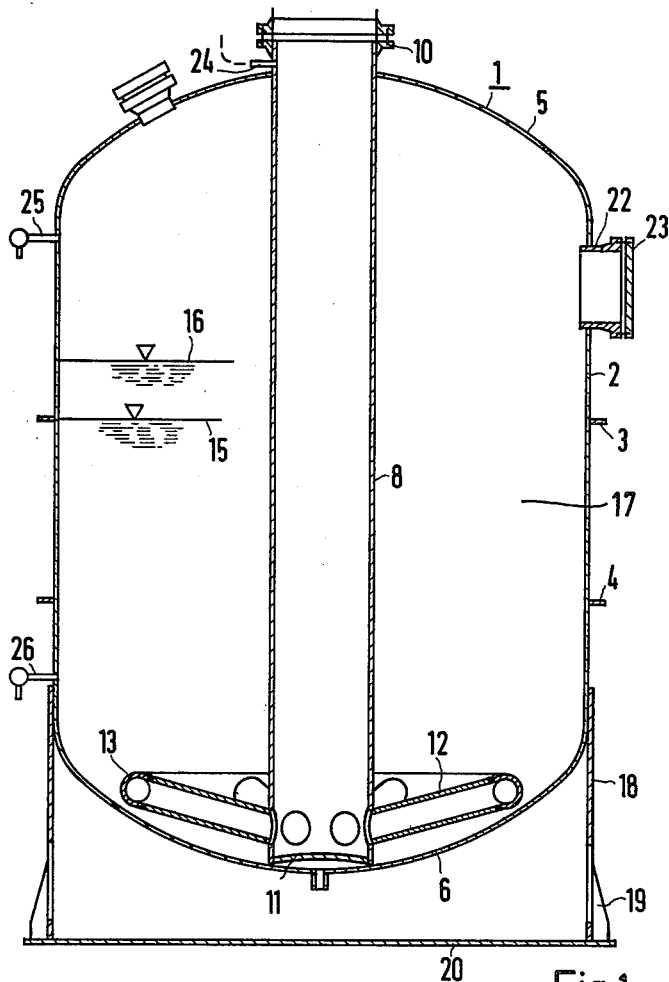
FIG. 1 is a vertical section of the new pressurizer relief or surge tank.
Figure 2:
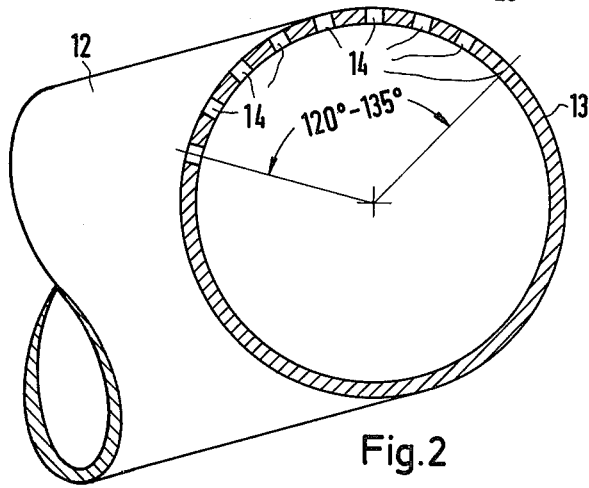
FIG. 2, partially in perspective, shows a cross section through the previously referred to annulus or ring pipe steam distributor.

Having reference to the above drawings, the new pressurizer relief or surge tank 1 comprises a closed pressure-resistant tank having a vertically elongated, cylindrical side wall 2, reinforced externally by annular flanges 3 and 4, and having a domed top 5 and a domed bottom 6, both being domed outwardly with respect to the tank's interior.

The surge steam pipe 8 extends vertically downwardly through the domed top 5 concentric with the axis of the cylindrical wall 2, this pipe being welded to the top 5 in a pressure-tight manner. A flanged pipe joint 10 on the outside of the tank serves to connect the upper end of the pipe 8 with the pipe line which comes from the pressurizer of the reactor coolant system.

The pipe 8 extends substantially to the bottom 6 of the tank, where the steam surge pipe 8 is closed off by an inwardly convex baffle plate 11. Adjacently above this baffle plate 11 six connecting pipes 12 radiate outwardly with an inclination substantially matching the curvature of the bottom 6, these connecting pipes 12 being uniformly interspaced from each other in the circumferential direction. These pipes 12 connect with the previously-referred-to distribution pipe means 13, or ring pipe, having in its upper portion the widely distributed holes 14 transversely, with respect to the cross section of the annulus 13, embracing an angularity of from 120° to 135°. These holes 14 are on the upper side of the annulus or ring pipe 13. Although a tubular annulus 13 is shown as a preferred embodiment it is being understood that the distribution pipe means can comprise a open loop pipe and/or of cross section other than tubular.

In FIG. 1 the normal level of the water within the tank is shown at 15 while the typical increase in the water level when the tank initially receives a steam surge from the pressurizer, is indicated at 16. The upper part of the tank is, of course, filled with pressurized gas under a pressure suitably related to the pressure provided by the reactor coolant system pressurizer.

The bottom periphery of the tank's cylindrical wall 2 is provided with a support in the form of a skirt 18 welded to the tank wall 2, the support being stiffened by welded webs 19 and transmitting the weight of the tank to a flat steel base plate 20, all of the connecting parts being welded together. The tank should be placed on a base capable of resisting the reaction forces resulting from the transmission of a steam surge into the tank through its vertical pipe 8, as well as thermal motions and the like which might then occur.

The cylindrical wall 2, near its top, is provided with an access opening 22, normally closed by a removable plate 23, and providing access to the interior of the tank for repairs or inspections.

To adjust the gas cushion pressure within the tank, a gas line 24 connects with the top of the vertical pipe 8 on the outside of the tank. The water level within the tank may be provided, adjusted, and maintained, by valve nipples 25 and 26, respectively arranged at high and low levels.

In operation, when the reactor coolant system pressurizer is forced to release steam, the steam, carried to this relief or surge tank by way of the connection 10, having a pressure greater than the gas cushion above the water in the tank, first pushes the water in the vertical pipe 8 downwardly through the uniformaly positioned connecting pipes 12 and the pipe means 13 and through the holes 14 inwardly into the water which is initially at the water level indicated at 15. Then the steam flows, the steam being very uniformly distributed upwardly in the tank and heats the water uniformly from bottom to top. The capacity of the tank $l$ is thereby fully utilized, the condensation zones being distributed throughout the entire water volume. This results in an advantageous self-regulation effect; because of the widely distributed condensation zones, the steam volume lifts the water level overall to 16, for example, thus further compressing the gas cushion in the tank above the water and, due the resulting back pressure, the water pressure, its saturation temperature and, therefore, the surge-absorbing capacity of the tank increases. The final pressure is independenof the starting pressure, and the new tank can even be operated with a slight under-pressure, this being advantageous in the event of a leak activity within the relief tank.

Overall, a smooth condensation adjacent to the uniformly distributed steam inflow, via the annulus 13, results, the temperature difference between the water and the steam being, therefore, relatively small.

It is to be noted that the new tank does not require an internal shroud providing ascent and descent flow paths, as has sometimes been required heretofore.

What is claimed is:

1. A relief tank in combination with a pressurized-water reactor cooling system for receiving and condensing steam from a steam space of a pressurizer of said pressurized-water reactor cooling system, said tank being closed and pressure-resistant and having means for providing water therein up to a level forming a space above the water, the tank having means for filling said space with gas and having a top and a substantially cylindrical side wall and a bottom, a steam pipe extending pressure-tightly downwardly with said side wall and having a bottom end portion close to said bottom of said tank, said pipe having a top outside of the tank connected pressure-tightly with said steam space, said bottom end portion of said pipe connecting with a plurality of imperforate pipes pressure-tightly radiating from said bottom end portion and having outer ends, and a tubular annulus being in connection with said outer ends, said imperforate pipes radiating outward in such a manner that said imperforate pipes and tubular annulus substantially match the inside contour of said tank's bottom, said tubular annulus having an upper portion and uniformly distributed holes being formed in said upper portion.

2. The tank of claim 1 in which the steam pipe has a diameter large enough to normally contain a substantial volume of said water extending up substantially to said level of the water in the tank.

3. The tank of claim 2 in which the steam pipe has a bottom end below the pipes radiating from the steam pipe's said lower end portion, and an upwardly convex baffle pressure-tightly closes the just-named bottom end.

4. The tank of claim 3 in which the holes formed in said annulus cover an angular range of from about 110° to about 135° circumferentially with respect to the cross section of the annulus.

5. The tank of claim 1 in which the steam pipe has a bottom end below the pipes radiating from the steam pipe's said lower end portion, and an upwardly convex baffle pressure-tightly closes the just-named bottom end.

6. The tank of claim 1 in which the holes formed in said annulus cover an angular range of from about 110° to about 135° circumferentially with respect to the cross section of the annulus.

7. The tank of claim 1 in which said pipes radiating from the steam pipe's said lower end portion, are substantially uniformly interspaced in a circumferential direction of the steam pipe.

8. The tank of claim 7 in which the steam pipe has a diameter large enough to normally contain a substantial volume of said water extending up substantially to said level of the water in the tank.

9. The tank of claim 8 in which the steam pipe has a bottom end below the pipes radiating from the steam pipe's said lower end portion, and an upwardly convex baffle pressure-tightly closes the just-named bottom end.

10. The tank of claim 9 in which the holes formed in said annulus cover an angular range of from about 110° to about 135° circircumferentially with respect to the cross section of the annulus.

* * * * *